US008989037B2

(12) United States Patent  
Matthews et al.

(10) Patent No.: US 8,989,037 B2  
(45) Date of Patent: Mar. 24, 2015

(54) SYSTEM FOR PERFORMING DATA CUT-THROUGH

(75) Inventors: Brad Matthews, San Jose, CA (US); Puneet Agarwal, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 64 days.

(21) Appl. No.: 13/610,165

(22) Filed: Sep. 11, 2012

(65) Prior Publication Data

US 2013/0322271 A1 Dec. 5, 2013

Related U.S. Application Data

(60) Provisional application No. 61/654,395, filed on Jun. 1, 2012.

(51) Int. Cl.  
*H04L 12/28* (2006.01)  
*H04L 12/26* (2006.01)  
*H04L 12/43* (2006.01)  
*H04L 12/947* (2013.01)

(52) U.S. Cl.  
CPC .......... *H04L 43/0882* (2013.01); *H04L 49/251* (2013.01); *H04L 49/252* (2013.01)  
USPC .......................................... 370/252; 370/460

(58) Field of Classification Search  
CPC .................... H04L 47/50; H04L 49/30  
See application file for complete search history.

(56) References Cited

U.S. PATENT DOCUMENTS

| 5,491,687 | A | 2/1996 | Christensen et al. |
| 6,243,358 | B1 * | 6/2001 | Monin .......................... 370/229 |
| 6,496,516 | B1 * | 12/2002 | Dabecki et al. ............... 370/460 |
| 6,661,802 | B1 * | 12/2003 | Homberg et al. ............. 370/412 |
| 6,795,886 | B1 | 9/2004 | Nguyen |
| 7,729,239 | B1 * | 6/2010 | Aronov et al. ................ 370/229 |
| 8,184,540 | B1 * | 5/2012 | Perla et al. .................... 370/235 |
| 2002/0118692 | A1 | 8/2002 | Oberman et al. |
| 2003/0026206 | A1 * | 2/2003 | Mullendore et al. .......... 370/230 |
| 2007/0180119 | A1 * | 8/2007 | Khivesara et al. ............ 709/226 |
| 2008/0075002 | A1 * | 3/2008 | Fourcand ...................... 370/230 |
| 2008/0298380 | A1 * | 12/2008 | Rittmeyer et al. ............ 370/412 |
| 2010/0122141 | A1 * | 5/2010 | Arye ............................. 714/752 |
| 2011/0235652 | A1 * | 9/2011 | Hillier et al. ................. 370/428 |

FOREIGN PATENT DOCUMENTS

JP H09284303 A 10/1997

OTHER PUBLICATIONS

European Search Report from corresponding European Patent Application No. EP13002577.8, dated Aug. 22, 2013.

(Continued)

*Primary Examiner* — Edan Orgad  
*Assistant Examiner* — Rebecca Song  
(74) *Attorney, Agent, or Firm* — Brinks Gilson & Lione

(57) ABSTRACT

A system transfers data. The system includes an ingress node transferring data at a determined bandwidth. The ingress node includes a buffer and operates based on a monitored node parameter. The system includes a controller in communication with the ingress node. The controller is configured to allocate, based on the monitored node parameter, an amount of the determined bandwidth for directly transferring data to bypass the buffer of the ingress node.

19 Claims, 10 Drawing Sheets

(56) References Cited

OTHER PUBLICATIONS

Akram Ben Ahmed et al., Efficient Look-Ahead Routing Algorithm for 3D Network-on-Chip (3D-NoC), Journal of Latex Class Files, vol. 6, No. 1, pp. 1-12, Jan. 2007.

Ling Xin et al., A Low-Latency NoC Router with Lookahead Bypass, IEEE International Symposium on Circuits and Systems, pp. 3981-3984, ISCAS 2010.

* cited by examiner

600

| Buffer Fill Level | CUT-THROUGH ALLOCATION |
|---|---|
| 0 KB – 150 KB | 90 % |
| 150 KB – 450 KB | 50 % |
| 450 KB – 800 KB | 20 % |
| > 800 KB | 10 % |

| Buffer Fill Level | Time Performing Cut-Through | Credits | CUT-THROUGH ALLOCATION |
|---|---|---|---|
| Fill Level 1 | 0 ns – 500 ns | Yes | 90 % |
| Fill Level 1 | 500 ns – 1.5 μs | Yes | 80 % |
| Fill Level 1 | > 1.5 μs | Yes | 70 % |
| Fill Level 1 | 0 ns – 500 ns | No | 100 % |
| Fill Level 1 | 500 ns – 1.5 μs | No | 90 % |
| Fill Level 1 | > 1.5 μs | No | 80 % |
| Fill Level 2 | 0 ns – 500 ns | Don't Care | 60 % |
| Fill Level 2 | 500 ns – 1.5 μs | Don't Care | 50 % |
| Fill Level 2 | > 1.5 μs | Don't Care | 40 % |
| Fill Level 3 | 0 ns – 500 ns | Yes | 20 % |
| Fill Level 3 | 500 ns – 1.5 μs | Yes | 10 % |
| Fill Level 3 | 0 ns – 500 ns | No | 40 % |
| Fill Level 3 | 500 ns – 1.5 μs | No | 30 % |
| Fill Level 3 | > 1.5 μs | Don't Care | 0 % |

Figure 7

SYSTEM FOR PERFORMING DATA CUT-THROUGH

RELATED APPLICATIONS

The present patent application claims the benefit of the filing date under 35 U.S.C. §119(e) of provisional U.S. patent application Ser. No. 61/654,395, filed Jun. 1, 2012, which is hereby incorporated by reference.

TECHNICAL FIELD

This disclosure relates to systems and methods (generally referred to as systems) for transferring data. More specifically, this disclosure relates to a system for performing cut-through switching or data transfer.

BACKGROUND

Data and other information may be transmitted from one or more ports, nodes, locations, or devices to one or more other ports, nodes, locations, or devices. In some instances, a switching system or network switch may be used to facilitate the transfer of data between ports, nodes, locations or devices.

BRIEF DESCRIPTION OF THE DRAWINGS

The innovation may be better understood with reference to the following drawings and description. In the figures, like reference numerals designate corresponding parts throughout the different views.

FIG. 6 is a diagram of an exemplary allocation look-up table.

FIG. 7 is a diagram of an exemplary allocation look-up table.

DETAILED DESCRIPTION

With increasing technology and data transfer demands, emerging cloud network customers may benefit from high bandwidth aggregation devices for their networks. In addition to high bandwidth aggregation, a desirable system may have low latency data delivery. Latency may determine or reflect responsiveness and quality of results a user sees, or impact the revenue for the provider of the Internet service. As such, a system which provides high bandwidth aggregation and increased data delivery speeds may be useful.

Figure 1:
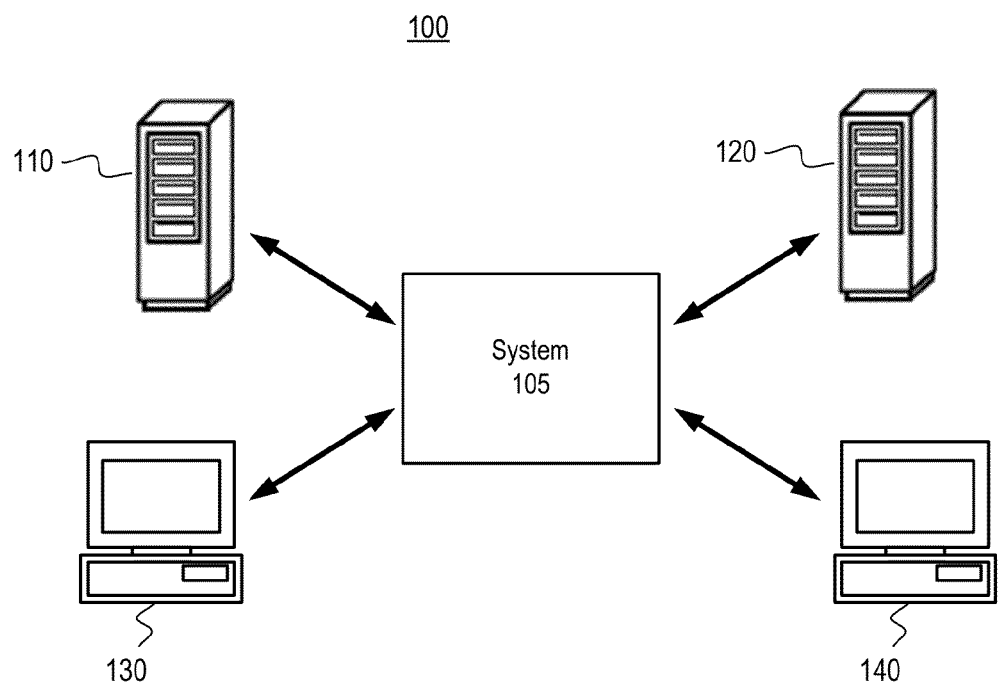
FIG. 1 is a block diagram of an exemplary network for transferring data.

FIG. 1 is a block diagram of an exemplary network 100 for transferring data. The network 100 may include various devices, such as one or more servers 110 and 120 and one or more computers 130 and 140. The network 100 may include a set of servers or a server bank. The network 100 may include a vast network of interconnected computers or network devices. The devices may be interconnected as part of a data center, or may be devices interconnected in an automotive environment. The network 100 may include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more systems, such as system 105, may be implemented to facilitate communication between the one or more devices of the network 100. Some or all of the devices of the network 100, such as some or all of the servers 110 and 120 and computers 130 and 140, may be connected or otherwise in communication with each other, through or using the system 105.

Figure 2:
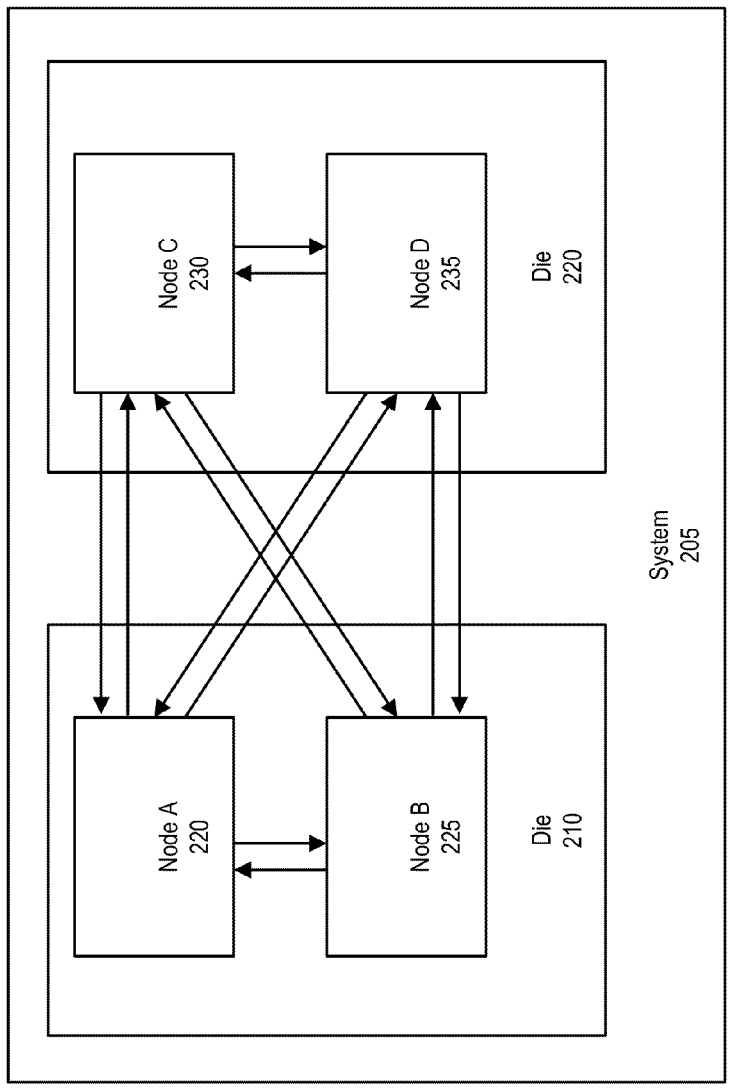
FIG. 2 is a block diagram of an exemplary system for transferring data.

FIG. 2 is a block diagram of an exemplary system 205 for transferring data. The system 205 may be similar to, the same as, or resemble the system 105. The system 205 may include one or more integrated circuits, chips, or dies 210 and 220. A die may refer to a block of semiconducting material, on which a given functional or integrated circuit may be fabricated. The dies 210 and 220 may include one or more tiles or nodes, such as node A 220 and node B 225 of die 210, and node C 230 and node D 235 of die 220. The system 205 may include a full mesh topology or another topology, such as a non-full mesh topology.

Systems, such as system 105 or 205, may have any number of dies, and dies may have any number of tiles or nodes. A node or tile may represent a single die in a chip. A node may refer to multiple chips in a device or system, or multiple devices in a system or chassis. A node may represent a single logical entity in one die. Some systems may include multiple die, where each die contains one or more nodes in a single chip or device. Some systems may additionally or alternatively include one or more chips or devices.

The nodes of the system 205 may include one or more ports. One or more devices, such as the servers 110 and 120 or computers 130 and 140, may connect or communicate with or through the system 205 using the one or more ports of the nodes. A node A 220 may have two ports, such that a server 110 may connect to a first port of the node A 220 and the server 120 may connect to the second port of node A 220. Nodes of a system may only have one port, or may have more than two ports.

Ports of a system 205 may be internal on a single chip or die, or may be spread across multiple chips or dies. The system 205 may, in some instances, be similar to or resemble a network switch. The system 205 may have any number of nodes or ports.

Ports in a tile or node may be, for example, ingress ports or egress ports. Data, bits of data, a data packet, a set of data, signals, or a frame (referred to as "data" or "data packet") may arrive at or be received by the system 205 at or through an ingress port. In some instances, the data packets may be large, and may arrive and/or be processed in smaller pieces (sometimes referred to as data "cells," "segments," "chunks," or "portions"). The data packet may depart from the system 205 at or through an egress port. Other variations or port types are possible.

Each die may contain one or more nodes or tiles. A device (such as a chip or package) may include one or multiple die. For example, a device may include two die, each die includes two tiles, such that the device includes four tiles. Other variations and examples are possible.

As an example, the server 110 may send a data packet to an ingress port of the node A 220 of the system 205, to be sent to the computer 130 connected with an egress port of the node B 225 of the system 205. The system 205 may transfer the data packet from the ingress port of node A 220 internally to the egress port of node B 225. The system 205 may transmit the data packet from the egress port of node B 225 to the server 120. Other variations and examples are possible.

Ingress ports and ingress nodes may transmit data to egress nodes or egress ports in various ways. In a store-and-forward data transfer, an ingress port may receive data segments of a data packet. The ingress port may store the data segments in memory or a buffer internally within the ingress port or ingress node until the entire data packet has been received. Once the data packet is received at the ingress port and the egress port it is destined for is available to receive the data, the ingress port may be authorized to transmit the stored data segments of the data packet from the internal memory of the ingress port or ingress node to the egress port. In a store-and-forward data transfer, all data segments may be stored before the egress port transmits the data packet.

In a cut-through data transfer, the ingress port may receive data segments of a data packet. In a cut-through data transfer, the ingress port may transmit the data segments to the egress port without storing the data segments in an internal buffer or memory of the ingress port or ingress node. In a cut-through data transfer, the egress port may transmit a portion of the packet prior to having fully received the packet from the ingress port. Data may be transferred by the ingress port to the egress port with a lower delay when the data is being transferred using a cut-through data transfer than if the data is transferred using a store-and-forward data transfer.

Data transfer components of an ingress node may transfer data at or using a determined or set bandwidth (sometimes referred to as an "outgoing ingress node bandwidth"). A data transfer component may refer to one or more ingress ports or data transfer elements of the ingress node. Data to be sent using either store-and-forward or cut-through may depend on, be transferred using or according to, or otherwise require an amount of a determined bandwidth available or used by the ingress ports or ingress nodes.

One or more components of an ingress node, such as a control module, may be configured or operable to determine an allocation or amount of outgoing ingress node bandwidth that an ingress node may use to transfer data, such as using cut-through or store-and-forward. A determination of the allocation or amount of bandwidth may be based on or decided according to the state of the ingress node and one or more monitored parameters of the ingress node.

The ingress node, or a control module of the ingress node, may monitor parameters or values of parameters of the ingress node. For example, the ingress node may include a monitoring component which may track a value of a buffer fill level of an ingress node. The ingress node may determine and set, e.g., based on the monitored parameters or values, an allocation or amount of the outgoing ingress node bandwidth for transferring data using cut-through, e.g. without storing the data packet and/or before all of the data packet has been received. Additionally or alternatively, the ingress node may determine an allocation or amount of the outgoing ingress node bandwidth for transferring data using a store-and-forward, e.g., by storing the data packet before forwarding it. The amount of bandwidth determined by the ingress node or the control module may correspond to or reflect a number of ingress ports that the ingress node dedicates or otherwise uses for one type of data transfer. Additionally or alternatively, the amount of bandwidth determined by the ingress node or the control module may correspond to or reflect a portion of the outgoing ingress node bandwidth for transferring data using one or more types of data transfer.

Figure 3:
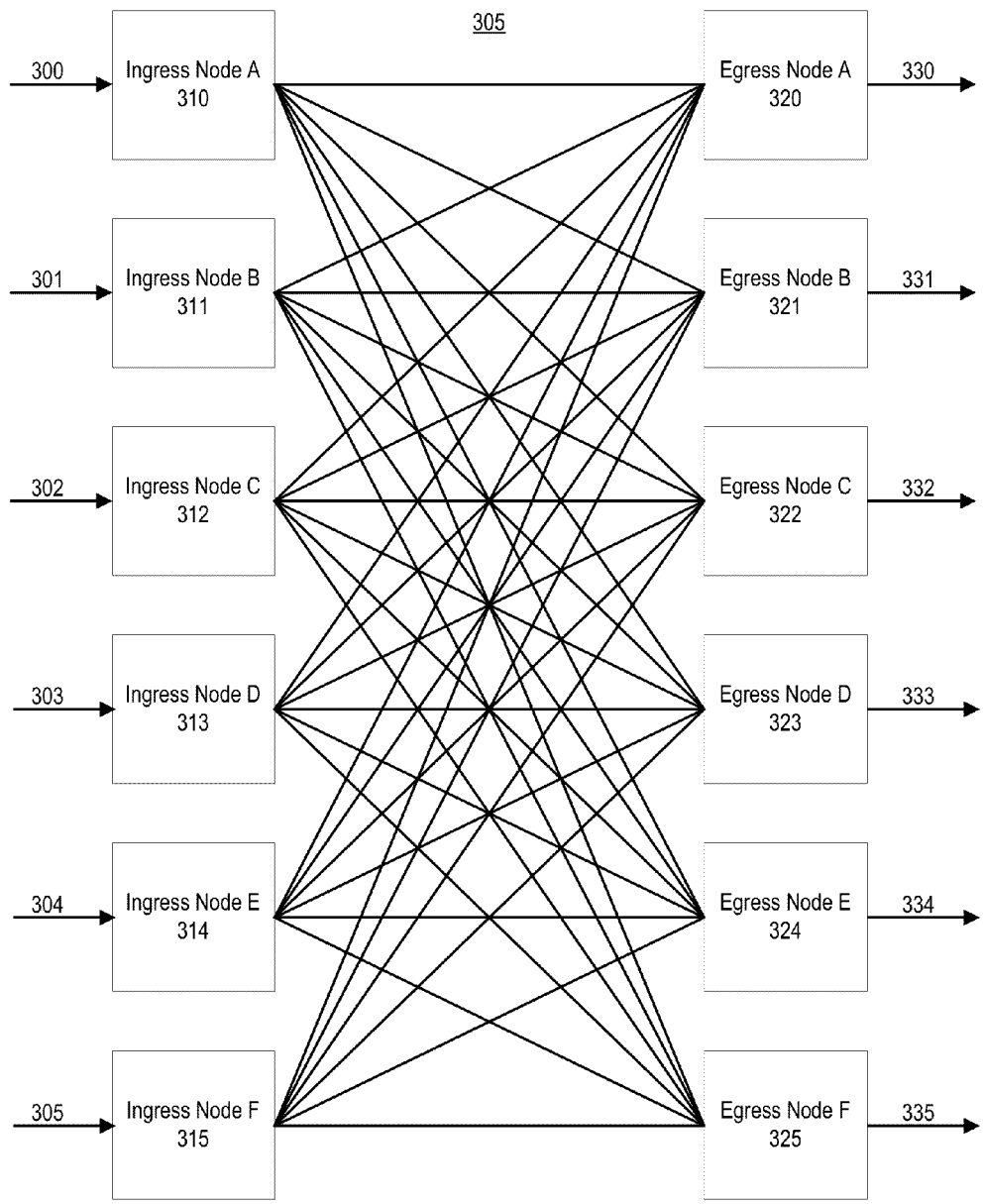
FIG. 3 is a block diagram of an exemplary system for transferring data.

FIG. 3 is a block diagram of an exemplary system 305 for transferring a data packet. The system 305 may be similar to, the same as, or different from the system 105. The diagram shows an example unfolded view of system 305 showing the system fabric including interconnections of various nodes of a system. The system 305 may be a full mesh topology. Ingress nodes 310-315 may be able to communicate or be connected with the egress nodes 320-325.

For simplicity, the system 305 may be described assuming the ingress nodes 310-315 includes only one ingress port, and the egress nodes 320-325 includes only one egress port. However, it should be appreciated that the nodes 310-315 and 320-325 may include more than one port. Where one or more of the ingress nodes 310-315 (or egress nodes 320-325) include multiple ports, the ingress (or egress) nodes may be configured or operable to communicate with the ports of the egress (or ingress) nodes.

The system 305 may include six ingress nodes with ingress ports, such as ingress node A 310, ingress node B 311, ingress node C 312, ingress node D 313, ingress node E 314, and ingress node F 315, and six egress nodes, such as egress node A 320, egress node B 321, egress node C 322, egress node D 323, egress node E 324, and egress node F 325. In other variations, the system 305 may have more or less ingress nodes or egress nodes.

Ingress ports of the one or more of the ingress nodes 310-315 and egress ports of the one or more egress nodes 320-325 may be configured or operable to be connected with or in communication with one or more devices. The ingress ports associated with the ingress nodes 310-315 may be connected with a server in a bank of servers.

Nodes or tiles may be connected to devices, and may include both an ingress port and an egress port. A node may include or operate as both the ingress port and egress port and may be connected to one device.

The ingress ports of the ingress nodes 310-315 may be configured or operable to receive a signal, data packet or other information, such as data 300-305. An ingress port of the ingress node A 310 may be configured or operable to receive data 300 from a server connected with the ingress node A 310. An ingress port of the ingress node C may be configured or operable to receive data 302 from a server connected with the ingress port of the ingress node C 312.

A piece of received data 300-305 may be directed, destined, or otherwise intended for one or more egress ports, such as an egress port of any one of the egress node A 320, egress node B 321, egress node C 322, egress node D 323, egress node E 324, or egress node F 325. In some instances, the received data 300-305 may be directed, destined, or otherwise intended for one or more devices connected with the system 305 through one or more of the egress ports on the egress nodes 320-325. For example, data 300 may be sent by a device to an ingress port of ingress node A 310, and may be destined or intended to be transmitted or sent to an egress port of the egress node D 323 or a device connected to the system 305 through egress node D 323.

In some systems, the received data 300-305 may specify or include an identifier which may indicate which egress port of an egress node 320-325 that the data is directed to, destined for, or otherwise intended to be sent to. A received packet of data may contain information that may be used by packet processing logic or a packet processing unit in a node to resolve a destination node or port. For example, a first data segment of a data packet may include one or more labels or identifiers that may indicate the destination egress port for that data segment and some or all other data segments for that data packet. In other systems, the ingress port or ingress node that received the data 300-305 may perform one or more functions or algorithms to determine the egress port of the egress node 320-325 that the data is intended to be sent to. For example, a PPU may resolve a destination address to a destination egress port. The data packet may be destined for one node or port, or may be a multicast packet that may have more than one destination node or port.

The ingress ports or ingress nodes 310-315 may process the received data 300-305, and may determine what egress port or egress node 320-325 that the data 300-305 should be sent to. The data packet may then be sent from the receiving ingress port or ingress node to the destination egress port or egress node that the data packet was intended for. In some systems, a data packet received at any ingress port of the ingress nodes 310-315 may be specified for, transmitted to, and/or otherwise sent to any of the egress ports of egress nodes 320-325 of the system 305. In other systems, a data packet received at some ingress ports may be restricted to transmission to only one or some of the egress ports. Other variations are possible.

The data packet may then be received by the destined egress port or egress node. The egress port or egress node 320-325 may perform one or more processes on the data, and then may output the data as output data 330-335 to one or more devices attached to the destination egress port of the egress node. Other variations and examples are possible.

A port may have one or more class of service, or priority level, associated with it. The class of services may have their own separate queues for data transfers to or from the port. As one example, a port may have 8 class of services, or priorities, each with a separate data queue. Other variations are possible.

Figure 4:
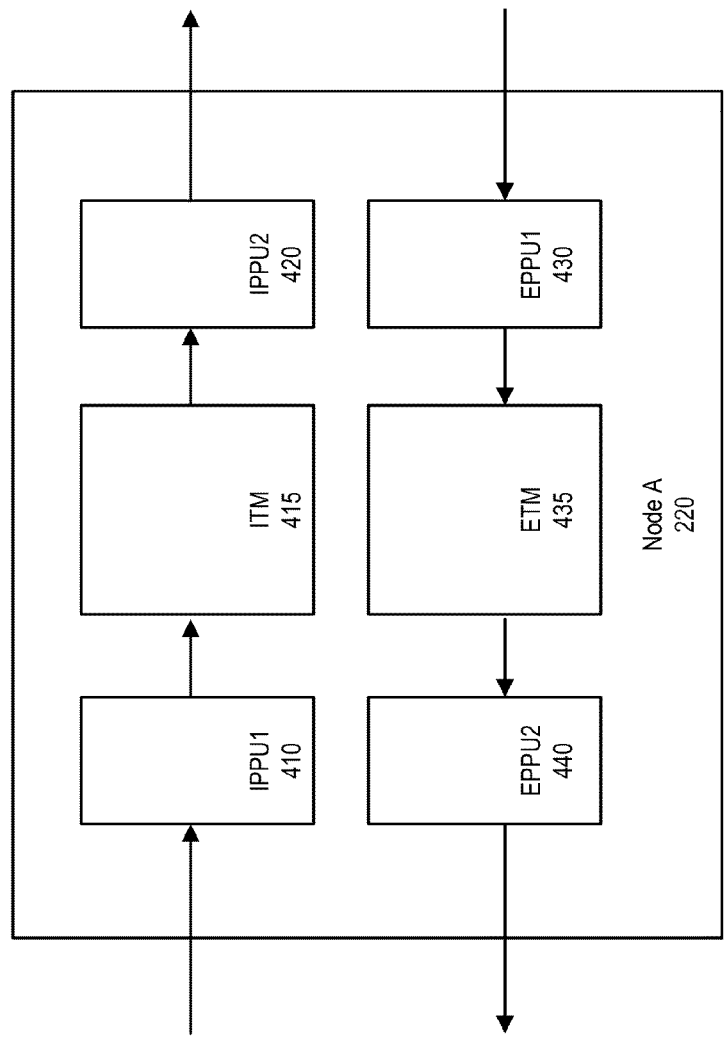
FIG. 4 is a block diagram of an exemplary node of a system for transferring data.

FIG. 4 is a block diagram of an exemplary node of a system for transferring data. The node A 220 in FIG. 4 may be the node A 220 of the system 205, and may operate to receive data packets from, or send data packets to, one or more other ports or nodes of the system 205 using a store-and-forward data transfer. The node A 220 may include, or operate as, one or both an ingress port and an egress port.

The system 205 may operate to transmit data packets between nodes and through the system 205 in various ways and using various data transfer types. In store-and-forward, a node of the system 205 may process data by storing segments of a data packet in a buffer or memory of the node or system 205 prior to transmitting the data packet from one node to another.

In store-and-forward, the node A 220 may be or operate as an ingress port and receive data packets from one or more devices connected or in communication with node A 220, such as at or through a network interface. For example, a node may have twelve ports configured to receive 1 gigabit of data per second. Other variations are possible.

The data packets received at the node A 220 may be specified as destined for one or more other node or ports of the system 205 (which may be referred to as "destination tiles," "destination nodes," "destination egress ports," or "destination ports"). A server 110 may be connected to an ingress port of the node A 220 of the system 205, and may transmit data to the ingress port of node A 220 to be transmitted to one or more other devices which may be connected with an egress port of a different node of the system 205, such as computer 130 attached to an egress port of node B 225. The destination node or destination port for the data may be the egress port of node B 225.

Packet processing may be performed upon receiving a packet by or with a packet processing unit ("PPU"), such as an ingress PPU ("IPPU") 1 410. IPPU1 410 may, for example, conduct an initial packet processing phase where the destination node(s) and/or port(s) may be determined or resolved. Afterwards, the data packets or segments may be forwarded to an ingress traffic manager ("ITM") 415.

The node A 220 may be ready to send or transmit data packet to an egress port of a node at various times and according to various conditions. For example, in some systems, data packets may be large, and may be received at the ingress port in data segments, which may be internally processed by the ingress port as they are received. In some instances, such as during some store-and-forward data transfers, the received data segments may be stored in the ITM 415 until all of the data segments of the data packet have been received and/or until the node is ready to send the data packet to an egress port. In some systems, the ingress port may perform one or more validity checks on the data packet prior to transmitting the packet. If the data packet is not valid, the ingress port may drop or not transmit the packet. In other instances, such as during some cut-through data transfers, data packets may not be stored in the ITM 415.

As another example, an ingress port of node A 220 may store received data segments, or entire data packets, within the ITM 415 until the egress port is ready to receive the data segments or data packets. Multiple ingress ports may have data packets to be sent to an egress port. In these, if the egress port is already receiving data from one ingress port, the egress port may not be configured or operable to receive data from the ingress port of node A 220. As another example, in some systems, an egress port may have data (such as store-and-forward data) it has received at a previous time or clock cycle, and may need to process or otherwise transmit the data to one or more devices. In some of these systems, the egress port may not be capable or operable to receive a data packet from the ingress port of node A 220. An egress port may additionally or alternatively be flow controlled or otherwise controlled to restrict the flow of data to the egress port (sometimes referred to as "data flow controlled"). An egress port may be flow controlled, for example, where a device that the egress port is connected or in communication with is full, congested, or otherwise cannot accept any more data, and alerts the egress port of this status. In some of these systems, the egress port may not be capable or operable to receive data from the ingress port of node A 220. Where an egress port has associated with it more than one class of services or priorities, the flow control of the egress port may be applied on a per class of service basis. For example, where the egress port has four class of services, the port may be flow controlled for the first class of service, and not flow controlled for the other three class of services. Other variations are possible.

In these and other systems, the data packet may be stored in the ITM 415 of the ingress port of node A 220 until the egress port is available to receive the data, such as when the egress port is idle. In some instances, the ingress port of node A 220 may not be ready to send the data packet until one or more combination of factors are satisfied, such when all of a data packet has been received and the egress port is ready to receive the data packet. Other variations are possible.

In store-and-forward, when the ingress port of node A 220 is ready to send or transmit the data packet stored in the ITM 415 to a destination egress port, the data packet may first be sent to one or more packet processing units which may perform additional processing on the data packet prior to the transmission to the egress port. For example, the data may first be sent to or passed through an IPPU2 420, which may perform one or more processes on the data. The data may then be transmitted after such additional processing to the destination egress port of the egress node of the system 205, such as by or through a tile fabric adaptor or other component. In other systems, the data packet may be ready to be transmitted without further packet processing.

The node A 220 may also be, include, or otherwise act as an egress port. A data packet which was sent or transmitted by a different port or node in the system 205 may be received by the egress port of node A 220. Once received, the data packet may be transmitted or sent to one or more packet processing units, such as an egress PPU ("EPPU") 1 430, which may perform one or more processes on the received data packets before passing them to an egress traffic manager ("ETM") 435. For example, the EPPU1 430 may perform destination multicast resolution to determine all of the destination egress ports.

The ETM 435 may be a memory, buffer, or storage which may receive data packets, or data segments, from the egress port. The ETM 435 may store the received data packets or data segments until the egress port of the node A 220 is ready to send or transmit the data packet to a device in connection with the node A 220 (such as the server 110). In some systems, the egress port of the node A 220 may not be ready to send or transmit data packet to a device in connection with the node A 220 until the entire data packet has been received at the egress port of node A 220. In some systems, the egress port of the node A 220 may not be ready to send or transmit data packet to the device in connection with the node A 220 until the device indicates that it is ready to receive the data packet. In some systems, the egress port of the node A 220 may not be ready to send the data packet stored in the ETM 435 until one or more combinations of these or other conditions are satisfied. Other variations are possible.

When the egress port of node A 220 is ready to send the data packet to the device, the data packet may be sent from the ETM 435 one or more packet processing units, such as an EPPU2 440, which may perform some processing on the data packets prior to transmitting the data packets from the egress port. Afterwards, the data may be transmitted to the device, such as by or through an interface. In other examples, the data packet may be sent from the ETM 435 directly to the device without any further processing of the data packet.

In some systems, a node or tile, such as node A 220, may additionally or alternatively include one or more controllers or control modules. A port of a node or tile may have a controller or control modules. Controllers, control components, or control modules may include one or more of the components of the node A 220, or various other components. The controllers or control modules may perform various functions or tasks. For example, the control modules may analyze and determine a destination egress port from a received data segment or data packet. As another example, a control module may perform one or functions, run one or more algorithms, and/or make one or more determinations which may affect or control a function or performance of the node or a port of the node. The controllers or control modules may perform various other functions or tasks.

In contrast to the store-and-forward data transfer, in some systems, data packets may be processed and transmitted from an ingress port of node A 220 using a cut-through data transfer (sometimes referred to as "cut-through," "cut-through switching," or "cut-through data transfer"). With cut-through, partial data frames or packets can be forwarded before the whole frame has been received, such as soon as the destination address is processed. With cut-through, data segments of a data packet may be transferred by an ingress port or ingress node to an egress port or egress node without being stored in a buffer or memory of the ingress node, such as the ITM 415.

In cut-through, data segments or a data packet may be received by the node A 220. In cut-through, however, the data segments or a data packet may gain access to the fabric bandwidth after an initial packet processing at the IPPU1 410 to determine a destination node, without waiting for the full data packet to have arrived at the ingress node. For example, the received data segments may be sent by the ingress port of the node A 220 to the egress port of the recipient node immediately upon receipt and resolution of the destination node, without waiting for all data segments of the data packet to be received. The data segment of a data packet may be transmitted by the ingress port of node A 220 to the recipient node before all of the other data segments of the data packet have been received at or processed by the ingress port of node A 220.

The received data segments may, in some instances, be transmitted to the egress port without being stored in any physical memory or a buffer, such as ITM 415. Alternatively, the one or more data segments may be stored in memory prior to transmission to the egress port. Because the data segments transmitted using cut-through may bypass physical memory or a buffer, no time may be needed or spent reading data out from the memory or buffer. Additionally, cut-through data transfers may create a lower delay, as some data segments may be transferred prior to receipt of the entire data packet. As such, cut-through data transfers may lower delays and/or be faster and more-efficient than store-and-forward data transfers for transferring data packets between ingress ports and egress ports.

Ingress ports or nodes and egress ports or nodes may be referred to as operating in a "store-and-forward mode" or in a "cut-through mode." When operating in store-and-forward, the ingress ports may transmit data to a destination egress port using a store-and-forward data transfer, and the egress ports may receive data from an ingress port using a store-and-forward data transfer. When operating in cut-through, the ingress ports may transmit data to a destination egress port using a cut-through data transfer, and the egress ports may receive data from an ingress port using a cut-through data transfer. Other terms and variations are possible.

Data may be transmitted or transferred between an ingress node and an egress node according to one or more architectures. In a pull architecture, an egress node may provide one or more ingress nodes with an allowance or credit of data that may be permitted to be sent to the egress node. An egress node may provide an allowance or credit to one or more ingress nodes equal or closely approximate to a processing rate of the egress node. Traffic or data that is provided to an egress node in accordance with an allowance provided to an ingress node in a pull architecture may be referred to as scheduled traffic.

In a push architecture, an ingress node may forward data segments or packets to one or more egress nodes. The data segments or packets may be forwarded at a high rate, such as at the highest rate possible for the ingress node. In a push architecture, an egress node may receive data from multiple ingress nodes, and the rate of receipt of data may exceed a processing rate for the egress node. An egress node may instruct an ingress node to stop sending traffic, or may otherwise control a flow of data ("flow control"), when an arrival rate of data exceeds a threshold value, such as a maximum processing rate of the egress node. Traffic or data provided to an egress node by an ingress node according to a push architecture may be referred to as unscheduled traffic. An example of unscheduled traffic may be or include data transferred to an egress node using a cut-through data transfer ("cut-through data"). Other architectures of ways of transferring data may be possible.

An ingress node may be configured or operable to transfer data at a determined transfer rate, or according to, using, or at a determined bandwidth. The determined bandwidth may be or represent a finite amount of bandwidth and/or time through which the ingress node may transmit data to one or more egress nodes. Ports may have a finite receive and transmit bandwidth, while a system 205 may have an aggregate bandwidth achieved by combining the bandwidth of the ports of the system. As an example, a system may have four ports with a bandwidth of 100 gigabits per second, and the system 205 may have an aggregate bandwidth of 400 gigabits per second.

An ingress node or ingress ports may receive data at first rate, and may transmit data at a second rate. An ingress node may additionally store data in a buffer, such as the ITM 415. For example, the ingress node may store data in excess of the data which the ingress node may process at any one time. The buffer may be various sizes, such as greater than an amount of bandwidth available at a given time for the ingress node.

An ingress node, or a control module of an ingress node, may control the ingress ports of the ingress node. A control module of an ingress node may, for example, determine a resource allocation of the ingress node or ingress ports of the ingress node, and may control how and to what egress port each ingress port may transmit or otherwise deliver data to.

Figure 5:
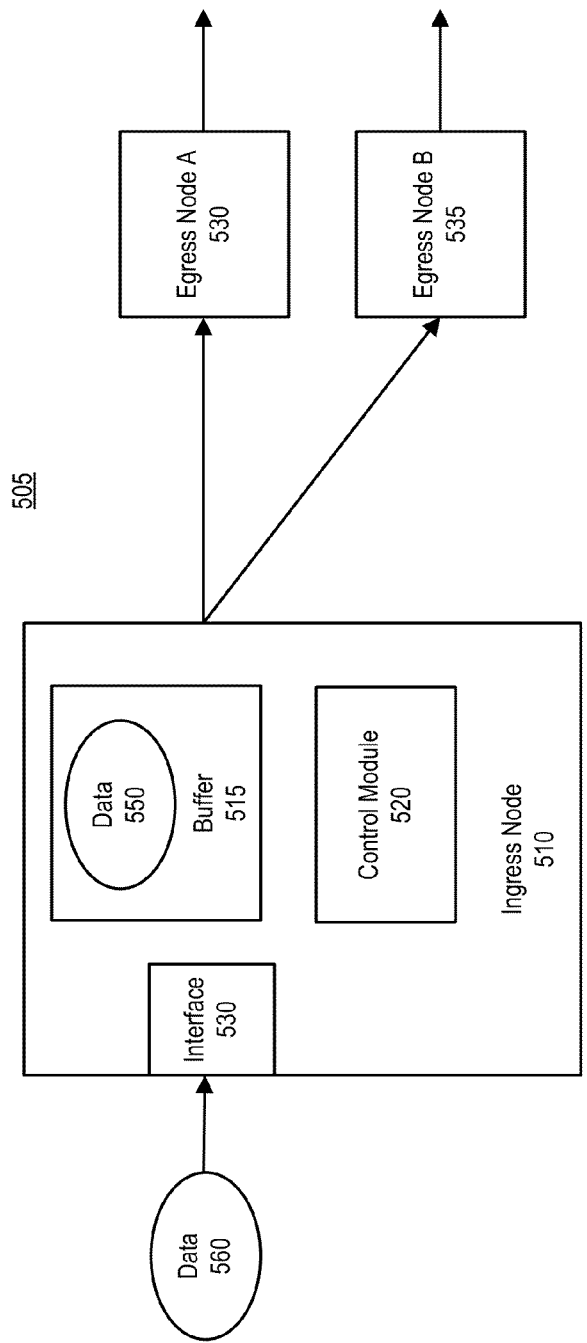
FIG. 5 is a block diagram of an exemplary system for transferring data.

FIG. 5 is a block diagram of an exemplary system 505 for transferring data. The system 505 may include an ingress node 510 and two egress nodes A 530 and B 535. The system 505 may be similar to or otherwise resemble the system 105 and 205. While one ingress node and two egress nodes are shown in system 505 for simplicity, in other systems, more or less ingress or egress nodes may be included.

The ingress node 510 may be similar to, the same as, or otherwise resemble one or more of node A 220, node B 225, node C 230, node D 235, or the ingress nodes 310-315. The ingress node 510 may include one or more of the components of node A 220. The ingress node 510 may have one or more ingress ports.

The ingress node 510 may additionally or alternatively include memory or a buffer 515. The buffer 515 may be the same as, part of, or include the ITM 415, or may be a different buffer from the ITM 415. The buffer 515 may be configured or operable to store data, such as data 550. Data 550 may include a data segment or data chunk, a data packet, a bit or byte of data, or various other data or information. The buffer 515 of the ingress node 510 may be configured or operable to store a data packet, or segments of a data packet, destined to be sent to one or more egress nodes or egress ports when the entire data packet is received by the ingress node 510, such as using a store-and-forward data transfer. One or more ingress port of an ingress node 510 may have a separate buffer 515 to store data 550, or there may be one buffer 515 which may store data 550 for some or all ports of the ingress node 510. Other variations are possible.

The ingress node 510 may be configured and/or operable to receive and/or store two or more different sets of data or data packets at the same time, one or more of which may be destined for a different egress port or egress node. The ingress node may receive and store data 550 destined for a first egress node, such as egress node A 530. The data 550 may be a data packet that the ingress node 510 may store as store-and-forward data, to transmit to the egress node A 530 when all of the segments of the data 550 have been received and/or stored by the ingress node 510. The ingress node 510 may also or alternatively receive another, different set of data or data packet, such as data 560. Data 560 may be received the ingress node 510 at an interface 530 of the ingress node 510. Data 560 may be received while data 550 is being received or is stored in the buffer 515. The data 560 may be a data packet that may be destined for the egress node B 535.

The ingress node 510 may identify, determine, or receive an indication that the egress node B 535 may be idle, eligible, available, or otherwise capable of receiving data, such as the data 560, from the ingress node 510 using a cut-through data transfer. The ingress node 510 may receive the indication from a centralized control or determination system that may determine and communicate to the ingress node 510 whether or not the transmitting the data 560 to the egress node B 535 will result in any data collisions at the egress node B 535. Alternatively or additionally, the ingress node 510 may determine whether or not the egress node 535 may is idle, available, or otherwise capable of receiving data through a cut-through data transfer in various other ways. When the ingress node 510 determines that the egress node B 535 is idle, available, or otherwise capable of receiving the data 560 using the cut-through data transfer, the ingress node 510 may determine that the egress node B 535 may be configured or operable to receive a transfer of the data 560 without the ingress node 510 having received the entire data packet for the data 560, and without the data 560 having been stored in any buffer or memory of the ingress node 510.

The ingress node 510, in transfer data 560 to the egress node B 535, may need, use, require, or otherwise occupy some or all of the outgoing bandwidth of the ingress node 510. The outgoing bandwidth of the ingress node 510 may be the bandwidth the ingress node 510 may use for transferring to another egress node or to a local egress port. However, an immediate transmission of the data 560 with a higher priority than the data 550 may result in the data 550 being stored in the buffer 515 longer and may delay the data 550 from being transmitted to the egress node A 530 as long as the ingress node 510 is receiving data, such as data 560, that may be transmitted to an egress node, such as egress node B 535, using a cut-through data transfer.

The ingress node 510 may include a controller, control component, or a control module 520. The control module 520 may perform one or more other functions or tasks, may perform or run one or more algorithms, and may control one or more aspects, functions, operations, or data transfers of an ingress node or ingress port.

The control module 520 may control an allocation of resources of the ingress node 510. The control module 520 may allocate, determine, and set one or more amounts of the outgoing ingress node bandwidth of the ingress node 510 that may be used for one or more data transfers. The control module 520 may determine the amount of the ingress node bandwidth in accordance with or based on the ingress node state and/or one or more monitored parameters of the ingress node 510. The control module 520 may effectively balance the need and efficiency of send cut-through data 560 to an egress node B 535 immediately with a need and fairness in sending stored data 550 to the egress node A 530 without incurring an undue or indefinite latency or delay. Additionally or alternatively, the control module 520 may perform one or more other functions for an ingress node 510, such as analyzing and determining a destination egress port from a received data segment or data packet, or determining whether or not a destination egress node or port may be idle, available, or otherwise operable to receive data from the ingress node 510 using a cut-through data transfer.

The control module 520 may include one or more of the components of the node A 220, such as a monitoring component to monitor parameters of the ingress node 510, and various other components. A control module 520 may control or direct some or all ports of the ingress node 510, or one or more ingress port of an ingress node 510 may have a separate control module 520 for the ingress ports. Other variations are possible.

In determining and setting a resource allocation, the control module 520 may monitor data and values of parameters of the ingress node 510 (sometimes referred to as "node parameters,"). The monitored node parameters may be or may describe one or more states, characteristics, features, or other elements of the ingress node or of a data transfer being performed by the ingress node 510. The control module 520 may track values of the monitored node parameters to create, set, adjust, change, or otherwise modify an allocation or amount of bandwidth of the ingress node for transferring data using one or more types of data transfers (such as an amount of bandwidth for transferring store-and-forward data and an amount of bandwidth for transferring cut-through data).

An ingress node parameter that the control module 520 may monitor may be or include a buffer fill level of the ingress node 510, or a level or amount of the buffer 515 which may have data 550 stored in it. The buffer fill level may indicate how much store-and-forward data 550 the ingress node 510 has that is waiting to be transmitted to an egress node, such as egress node A 530. The buffer fill level may be expressed in various ways, such as an exact or estimated buffer fill level, a range of buffer fill levels, or a category or state of buffer fill level. Other variations are possible.

An ingress node parameter that the control module 520 may monitor may be or include a duration that the ingress node 510 has been transferring data using a cut-through data transfer. The duration may refer to a length of time that the ingress node 510 has been continuously performing data transfers for data, such as data 550, using the cut-through data transfer. The duration may additionally or alternatively refer to an accumulated time, or a ratio of time over a given time period, that the ingress node 510 has been performing data transfers using the cut-through data transfer. The duration may alternatively refer to time that the ingress node 510 has been transferring data using a store-and-forward data transfer. The control module 520 may monitor or receive data or information about the duration.

An ingress node parameter that the control module 520 may monitor may be or include a credit or pull algorithm attribute. The credit or pull algorithm attribute may be allocated to the ingress node 510 for one or more of the egress nodes 530 or 535. An egress node A 530 may be configured or operable to receive a given amount of data, and may send to one or more ingress nodes, such as the ingress node 510, an allowance or credit. The credit may indicate how much and/or when data may be transmitted to the egress node A 530 by the ingress node 510. Determining or identifying an allowance or credit may be useful, for example, when an ingress node 510 has a lot of data 550 stored, but does not have a credit to transfer the data to the egress port A 535, and thus may not benefit from a large store-and-forward allocation. The control module 520 may monitor information, data, or values for credit information for the ingress node 510.

An ingress node parameter that the control module 520 may monitor may be or include an enqueue or dequeue rate. An enqueue rate may refer to a time or rate at which the ingress port may package or transmit data segments to an egress port. A dequeue rate may refer to a time or rate at which the egress port may dequeue data segments it receives. Enqueue or dequeue rates may be a measure of a packet per time period. An enqueue or dequeue rate may vary with a size of a data segment that may be transferred by an ingress node to an egress node over a bus. A transferring ingress node (or receiving egress port) may need, use, or require a longer time or more resources to enqueue (or dequeue) smaller data segments sent over a bandwidth or bus line. Conversely, a transferring ingress node (or receiving egress port) may need, use, or require a shorter time or fewer resources to enqueue (or dequeue) larger data segments. Higher enqueue or dequeue rates may require more resources and may reduce or limit bandwidth available to transfer other data using a cut-through data transfer. The control module 520 may also or alternatively monitor values of various other ingress node parameters or combinations of ingress node parameters.

The control module 520 may analyze and use the monitored node parameters to determine and/or set a resource allocation for the ingress node. For example, the control module 520 may determine a resource allocation for the ingress node, or an amount of a determined outgoing bandwidth for transferring data that the ingress node may use to transfer store-and-forward or cut-through data, using one or more tables, such as an allocation look-up table. FIG. 6 is a diagram of an exemplary allocation look-up table 600.

The allocation look-up table 600 may provide, categorize, or otherwise list settings for one or more resource allocations, such as a bandwidth allocation or amount of a determined outgoing bandwidth. The settings may be a function of a value of one or more of the monitored node parameters. The allocation look-up table 600 may include a column 610 of values for a first monitored node parameter, such as a buffer fill level. The allocation look-up table 600 may also include a column 650 providing, categorizing, or otherwise listing a cut-through bandwidth allocation for one or more of the values of the first monitored node parameter shown in column 610. The cut-through bandwidth allocation may be an amount or percentage of a determined or set ingress node bandwidth that the ingress node may use or may otherwise be dedicated to performing data transfers using a cut-through data transfer. Data eligible to be transferred by the ingress node 510 using a cut-through data transfer, such as data 560, may be transferred to a destination egress node using the amount or percentage of the determined or set outgoing ingress node bandwidth designated by the cut-through bandwidth allocation of the table 600.

The control module 520 may compare the monitored node parameter of the ingress node 510 with the settings for resource allocations provided in the allocation look-up table 600. As an example, the control module 520 may compare the received value for the first monitored node parameter with the values or range of values in the column 610 associated with the first monitored node parameter. When the control module 520 determines the received value of the monitored node parameter is within a found range of values in column 610, the control module 520 may determine or otherwise identify the resource allocation, such as the cut-through bandwidth allocation, according to the allocation listed in column 650 next to, or otherwise associated with, the found value or range of values in column 610.

For example, the control module 520 may determine a value of 250 KB for a first monitored ingress node parameter, such as a buffer fill level of the buffer 515 of the ingress node 510. The determined value may indicate that the buffer 515 has 250 KB of data 550 stored within the buffer 515 to be delivered to an egress node using a store-and-forward data transfer. The control module 520 may search one or more entries in the column 610 of the allocation look-up table 600.

The control module 520 may identify the entry 660 as corresponding to the monitored buffer fill level of the buffer 515, as the entry 660 may correspond to a range of buffer fill levels 150 KB to 450 KB which may include the monitored value for the buffer fill level of the buffer 515 of the ingress node 510. The control module 520 may identify or determine the resource allocation based on this setting as being 50% (the value of the entry in the column 650 that corresponded to the entry 660). The ingress node 510 may transfer cut-through data, such as data 560, using up to 50% of the outgoing ingress node bandwidth for transferring data. The node setting may be used, for example, to specify a peak bandwidth used for cut-through, collected through monitoring, that can be consumed before forcing traffic to store and forward. Various other examples are possible.

FIG. 7 is a diagram of an alternative exemplary allocation look-up table 700. The allocation look-up table 700 may provide resource allocation information that may be based on or set according to a combination of monitored ingress node parameters. The allocation look-up table 700 may include columns which list values or ranges of values for multiple monitored ingress node parameters. The entries, values and ranges are exemplary and may vary depending upon an implementation. The allocation look-up table 700 may include a column 710 that provides entries, values or ranges of values for a buffer fill level of a buffer 515 of an ingress node 510. The look-up table 700 may also include a column 720 that provides values or a range of values for a time that the ingress node 510 has been performing cut-through data transfers. The look-up table 700 may also include a column 730 that provides entries, values or a range of values for a credit for the ingress node 510. The allocation look-up table 700 may provide a resource allocation, such as a cut-through bandwidth allocation, that the ingress node 510 may be set, changed, or implemented to operate at based on the one or more monitored ingress node parameters identified in the allocation look-up table 700.

The control module 520 may compare identified values, data, or information about monitored ingress node parameters with the entries in the allocation look-up table 700 to identify a resource allocation setting. The control module 520 may determine the resource allocation for the ingress node 510 based on the comparison. For example, the control module may monitor ingress node parameters which may include a buffer fill level of a first category or falling within a buffer fill level 1 range, a value of a duration that the ingress node 510 has been transferring data using a cut-through data transfer of about 400 nanoseconds ("ns"), and an indication that the ingress node 510 has no credits. The control module 520 may compare the value of the monitored ingress node parameter to the entries of the allocation look-up table 700, and may identify the entry 760 that corresponds to the monitored ingress node parameters. Using the allocation look-up table 700, the control module 520 may determine that the cut-through allocation under the conditions of entry 760 may be about 100%. Other examples are possible.

Allocation look-up tables 600 and 700 may provide resource or bandwidth allocations for an ingress node 510 based on a variety of different ingress node parameters, or combinations of ingress node parameters. Allocation look-up tables may, for example, provide settings for bandwidth allocations that correspond to one or a combination of parameters, such as a duration the ingress node 510 has been transferring data using one or more data transfer types, a credit for the ingress node 510, an enqueue/dequeue rate for the ingress node 510, or various other parameters. Data eligible to be transferred by the ingress node 510 using a cut-through data transfer, such as data 560, may be transferred to a destination egress node using the amount or percentage of the determined or set outgoing ingress node bandwidth designated by the cut-through bandwidth allocation of the tables 600 or 700.

The allocation look-up tables 600 and 700 may provide settings for resource or bandwidth allocations in various forms or ways. The allocation look-up tables 600 and 700 may provide a percentage of a bandwidth or resources that should be allocated to one or more types of data transfer, such as a store-and-forward data transfer or a cut-through data transfer. The allocation look-up tables 600 and 700 may provide a number or identification of ports that may be used to transfer data using one or more types of data transfer. The allocation look-up tables 600 and 700 may provide an indication whether or not data may be transferred using one or more types of data transfer. Various other examples are possible.

Additionally or alternatively, the control module 520 may determine a resource allocation for the ingress node 510 using one or more action or state tables or diagrams.

Figure 8:
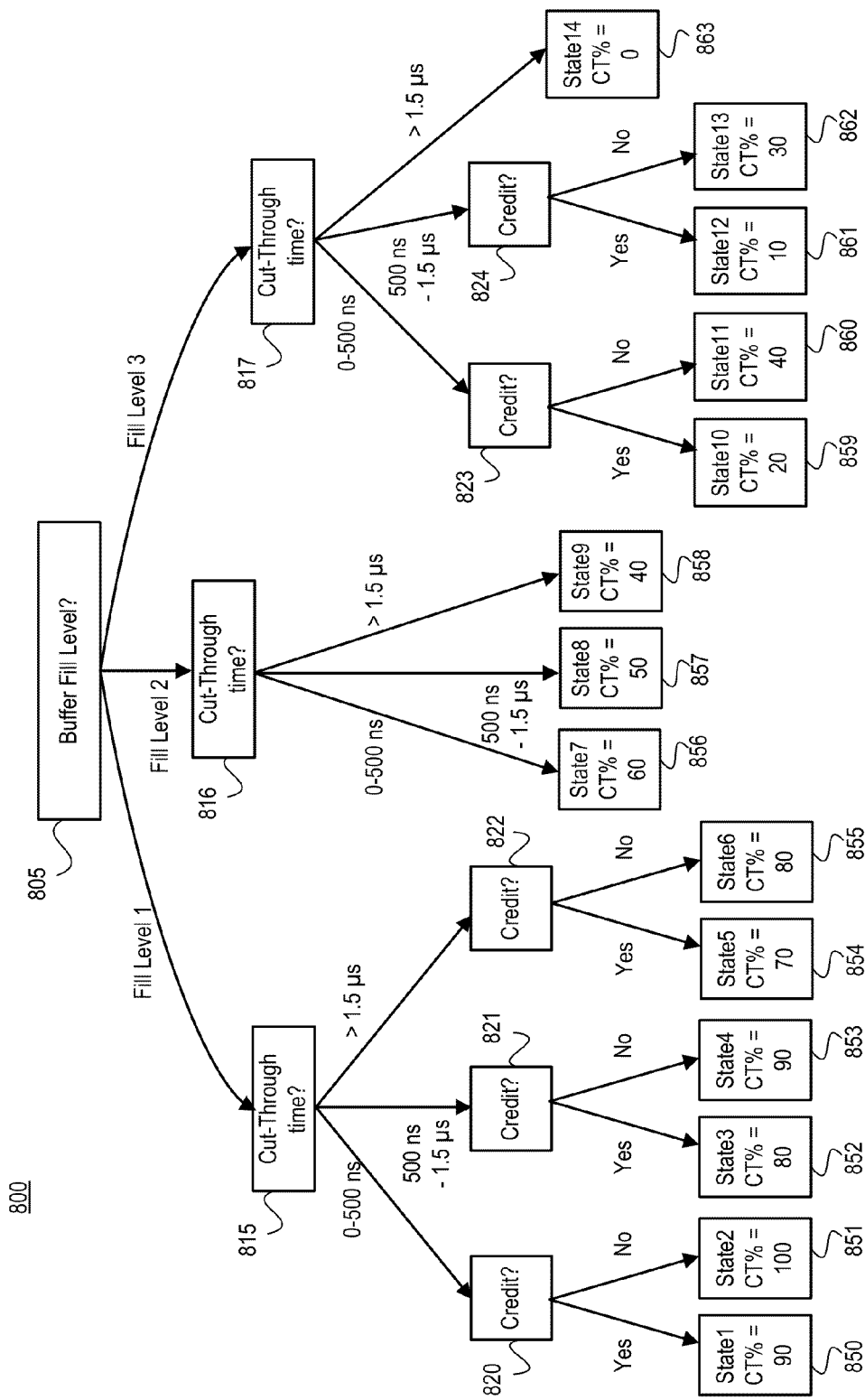
FIG. 8 is a diagram of an exemplary state table.

FIG. 8 is a diagram of an exemplary state table 800. The values in the state table 800 are for explanation purposes and may vary depending on an implementation. The state table 800 may be referred to or utilized by a control module 520 for determining an amount of outgoing ingress node bandwidth that may be used for transferring cut-through data. The state table 800 may result in a similar resource allocation as does the look-up table 700.

The control module 520 may use identified values of the monitored node parameters to navigate the state table 800. The state table 800 may include a decision tree which the control module 520 may navigate to find a state, such as one of the states 850-863, that may correspond to the present state of the ingress node 510. The decision tree may include one or more branch points, such as the buffer fill level branch 805, one or more cut-through time branches 815-817, or one or more credit branches 820-824. The control module 520 may navigate from branch points down appropriate branches of the state table based on the monitored node parameters of the ingress node 510. As an example, where the monitored ingress node parameters include a buffer fill level of a first category or falling within a buffer fill level 1 range, a value of a duration that the ingress node 510 has been transferring data using a cut-through data transfer of about 400 ns, and an indication that the ingress node 510 has no credits, the control module may proceed from the first branch point 805 along the buffer fill level 1 branch to the branch point 815, down the '0-500 ns' branch to branch point 820, and may proceed down the 'no' branch to the state 852. The state may indicate a resource allocation, such as a percentage of the determined outgoing ingress node bandwidth for transferring data using a cut-through data transfer.

The state table 800 may include one or more branch points, branches, and states which may be related to or based on one or more monitored ingress node parameters or values of parameters. The state table 800 may include similar branch points from each branch of a previous branch point (such as three cut-through time branch points 815-817 from each of the branches of the buffer fill level branch point 805). Additionally or alternatively, the state table 800 may include different branches from a branch point (such as two branch points 823 and 824 from the branches of the cut-through time branch point 817 and the state 14 863 as the third branch of the cut-through time branch point 817). Other variations are possible.

Additionally or alternatively, the control module 520 may determine a resource allocation for the ingress node 510 using one or more algorithms or formulas. An algorithm, formula, or other function may be operable to provide a resource allocation value based on one or more inputs.

The control module 520 may implement one or more formulas which may factor in or weight values for one or more monitored ingress node parameters in determining a resource allocation for the ingress node 510. One formula implemented by a control module 520 to determine a resource allocation may be:

$$CT\ \text{Allocation} = 100 * \min(1; 1.4 - (\text{buffer fill value}/1\ \text{MB}))$$

where CT Allocation may be a percentage of outgoing bandwidth allocated to a cut-through data transfer, and where the percentage of bandwidth allocated to a cut-through data transfer may be about 100% or 100*(1.4−(buffer fill level/1 MB)), whichever is less. A resource allocation algorithm may take into account different monitored ingress node parameters or various combinations of ingress node parameters to determine a resource allocation for the ingress node. The algorithm may, for example, take into account both a buffer fill level and a credit amount for the ingress node 510. Various other examples and variations of algorithms are possible. Alternatively or additionally, the control module 520 may determine a resource allocation of the ingress node 510 in various other ways and using various other tools or components.

Tables, such as allocation look-up tables 600 and 700, and/or the algorithms or formulas may be pre-determined or pre-configured by a programmer prior to use with an ingress node. Alternatively or additionally, tables and/or algorithms may be configured, determined, or otherwise set based on one or more observable or determinable features of a system. The allocation look-up tables and/or algorithms may be dynamic, may be changed, and/or may be updated. The bandwidth allocations provided by the allocation look-up tables 600 and 700 and/or algorithms may provide for a trade-off or balance between a need and priority to immediately transfer data segments that an egress port may receive using a cut-through data transfer and a desire to avoid unfairness and undue delay in transferring data 550 stored in a buffer 515 of the ingress node 510. As an example, an allocation look-up table or algorithm may provide for an increased cut-through bandwidth available to an ingress node 510 that has had data 550 stored in the buffer 515 for a long period of time, but where the ingress node 510 does not have a credit to transfer the data 550 to the destination egress port, and therefore may not need the bandwidth for store-and-forward data transfers. Other examples and variations are possible.

The control module 520 may set or implement a resource allocation. The resource allocation may be implemented once the resource allocation has been determined, such as using one or more allocation look up tables 600 and 700 or one or more algorithms or functions, or at various other times.

The control module 520 may implement the resource allocation by setting each of the ingress ports of the ingress node 510 to operate in one mode or to transfer data using one type of data transfer. The control module 520 may set the number of ingress ports in accordance with the determined resource allocation. Where an allocation look-up table 600 indicates, for example, that the cut-through bandwidth allocation for a given entry, such as entry 660, should be 50%, the control module 520 may designate half of the ingress ports of the ingress node 510 to operate in a cut-through mode, and the other half of the ingress ports of the ingress node 510 to operate in the store-and-forward mode. If the bandwidth allocation were 80%, for example, the control module 520 may set 4 of 5 ingress ports of the ingress node 510 to operate in the cut-through mode, while the remaining 1 of 5 ingress ports may be set to operate in a store-and-forward mode.

Additionally or alternatively, the control module 520 may configure the ingress ports of the ingress node to transmit a percentage or portion of data using different types of data transfer, or to allocate a percentage of the bandwidth at the ingress port to a type of data transfer. Where the control module 520 determines a cut-through allocation of 80%, for example, the ingress ports of the ingress node 510 may be configured to allocate 80% of the bandwidth available to the ingress port to transferring data using the cut-through data transfer, and the remaining 20% to transferring data using the store-and-forward data transfer.

Additionally or alternatively, the determination of a resource allocation may itself identify how to implement the resource allocation. One or more allocation look-up tables 600 and 700 may designate how each ingress port may be configured or operable, such as by indicating for an entry (such as entry 660 or 760) that ingress ports 1-4 of the ingress node 510 (for example) may be configured to operate in a cut-through mode, while ports 5-10 may be configured to operate in a store-and-forward mod. Additionally or alternatively, the control module 520 may compare a value of a monitored node parameter to a threshold value. The control module 520 may allocate some or all bandwidth for a data transfer using a store-and-forward data transfer or a cut-through data transfer the value of the node parameter is greater than or less than the threshold value. Other variations are possible.

The ingress node 510 may operate and transfer data based on the set or implemented resource allocations. Data, such as data 560, may be transferred by cut-through using a cut-through amount of an ingress node bandwidth that may be determined by an allocation look-up table, state table, algorithm or in various other ways. Data, such as data 550, may be transferred by store-and-forward using a store-and-forward amount of an ingress node bandwidth that may be determined by an allocation look-up table, state table, algorithm or in various other ways. The store-and-forward amount of the ingress node bandwidth may be the ingress node bandwidth not including the cut-through amount of the ingress node bandwidth. Other examples are possible.

Figure 9:
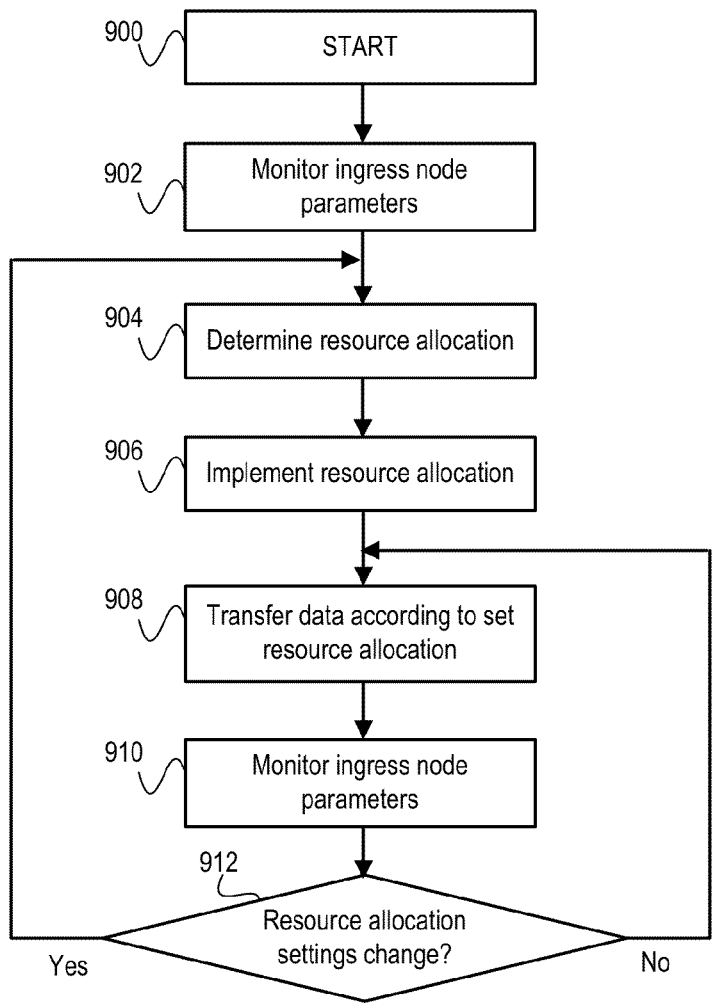
FIG. 9 is a flow diagram of an exemplary logic of transferring data.

FIG. 9 is a flow diagram of an exemplary logic for transferring data. The logic may be carried out, for example, by the control module 520 of the ingress node 510. The logic may be used to determine and set a bandwidth allocation of the ingress node 510. The bandwidth allocation values are for explanation purposes and may vary depending on an implementation. The ingress node may transfer or transmit data, such as store-and-forward data 550 and potential cut-through data 560, according to the set bandwidth allocation. The logic may begin at block 900.

At block 902, the control module 520 may monitor one or more node parameter of the ingress node 510. The control module 520 may monitor values for the monitored parameters such as a buffer fill level, credits for an ingress node 510, a duration of time the ingress node 510 has transferred data in one more or another, enqueue/dequeue rates, and/or various other ingress node parameters.

At block 904, the control module 520 may determine a resource allocation, such as a bandwidth allocation, port allocation, amount of determined bandwidth for transferring data, or other data transfer resource allocation, for the ingress node 510. For example, the control module 520 may identify a setting for a resource allocation that corresponds to the values of the monitored node parameters. The control module 520 may determine the resource allocation in various ways, such as by using or referring to a table like an allocation look-up table 600 or 700, or using an algorithm or formula. The control module may determine the resource allocation based on, according to, or otherwise as a function of one or more monitored values for one or more ingress node parameters.

Once the resource allocation has been determined, the logic may proceed to block 906. At block 906, the control module 520 or another component of the ingress node 510 may implement the resource allocation based on the monitored values of the parameters of the ingress node 510. The control module 520 may, in accordance with the determined resource allocation, set up or implement some or all of ingress ports of the ingress node to be operable or configured to transfer data using a first mode (such as store-and-forward mode), and/or some or all of the ingress ports of the ingress node to be operable or configured to transfer data using a second mode (such as cut-through mode). The control module 520 may, alternatively or additionally, configure or set up some or all of the ingress ports to allocate some bandwidth to data transfer using a first type of data transfer, and some or all of the bandwidth to data transfer using another type or mode.

The resource allocation, such as the bandwidth allocation, may indicate or guarantee an allocation for types of data transfers, such as an allocation for data transfer using a cut-through data transfer and an allocation for data transfer using a store-and-forward data transfer. Alternatively or additionally, the resource allocation (such as a bandwidth allocation) may indicate or guarantee a maximum allocation for a type of data transfer (such as a cut-through data transfer). As an example, a resource allocation may indicate a 40% maximum resource allocation for data transfer using a cut-through data transfer, where no more than 40% of the resource (such as bandwidth) may be used to transfer data using the cut-through data transfer. Resources (or bandwidth) that may be allocated as part of a maximum resource allocation but that may not be needed or used for data transfer (such as unused cut-through bandwidth) may be used to transfer data using another data transfer (such as store-and-forward). Other variations are possible.

At block 908, the ingress node 510 may transfer data according to the implemented resource allocation. For example, where the resource allocation is determined and implemented to provide about 40% bandwidth for store-and-forward data transfer and about 60% for cut-through data transfer, the data 550 in the buffer 515 may be transferred to the egress node A 530 using about 40% of the available bandwidth of the ingress node 510. The data 560 that the ingress node 510 is receiving for egress node B 535 may be transferred using about 60% cut-through bandwidth of the ingress node 510. A control module 520 may be configured to transmit data that may be stored in a buffer 515 of the ingress node 510, even where data 560 may be received and capable of being transmitted or transferred using a cut-through data transfer, in instances where an allocation look-up table or algorithm is configured as such. Other variations and examples are possible.

At block 910, the control module 520, ingress node 510, or another component in communication with the control module 520 or ingress node 510 may monitor the ingress node parameters. The control module 520 may, for example, monitor the buffer fill level of the buffer 515 of the ingress node, as well as the duration that the ingress node has transmitted data in accordance with the cut-through data transfer. The ingress node parameters may be monitored continuously, every clock cycle, periodically, at certain or determined intervals, when triggered, or at other times.

At block 912, the control module 520, the ingress node 510, or another component in communication with the ingress node 510, may determine whether the resource allocation settings have changed. The resource allocation settings may change when one or more ingress node parameters have changed. For example, a buffer fill level change from 750 KB to 200 KB may trigger a change in the resource allocation settings. A resource allocation setting may change when a value of the ingress node parameter has exceeded a threshold, switched from one range of values to a second range of values, or switched from one level or state to another level or state. The thresholds, ranges of values, and/or states or levels may correspond to values in an allocation look-up table or other defined values. For example, a buffer fill level change from 250 KB to 200 KB may not trigger a resource allocation setting change if the change did not move the buffer fill level from a first range of values to a second range of values (such as in relation to the allocation look-up table 700). Other variations are possible.

If no change in the resource allocation setting is detected, the logic may return to block 908. The data may continue to be transferred using the bandwidth allocation at block 908, and the control module 520, ingress node 510, or other component in communication with the ingress node 510 may continue to monitor the ingress node parameters.

If a change in the resource allocation setting is detected, the logic may return to block 904, where a new resource allocation may be determined based on the new ingress node parameters or resource allocation setting. At block 906, the resource allocation may be set or implemented, or merely may be updated.

In some variations, the logic of FIG. 9 may include fewer or more blocks or functions. In some variations, one or more blocks may perform different functions, or one or more blocks may be combined into fewer functions or determinations. In some variations, one or more blocks or functions may be performed in a different order or at the same time. Various other examples and variations of logic are possible.

The logic of FIG. 9 may enable the control module 520 and ingress node 510 to provide a resource allocation, or determine an amount of bandwidth, for the ingress node 510 which may facilitate data transfers using both the cut-through data transfer and the store-and-forward data transfer. By configuring the allocation look-up tables or algorithms, the resource allocation may be tunable and set to provide a balance and trade-off between the immediacy of transferring cut-through data with the desire to avoid undue delays in transferring store-and-forward data. The logic of FIG. 9 may be used to avoid bandwidth starvation under certain traffic scenarios and device configurations. The logic of FIG. 9 may further allow the control module 520 and the ingress node 510 to adjust and dynamically control the resource allocation of the ingress node 510 to change with the changing ingress node parameters.

Figure 10:
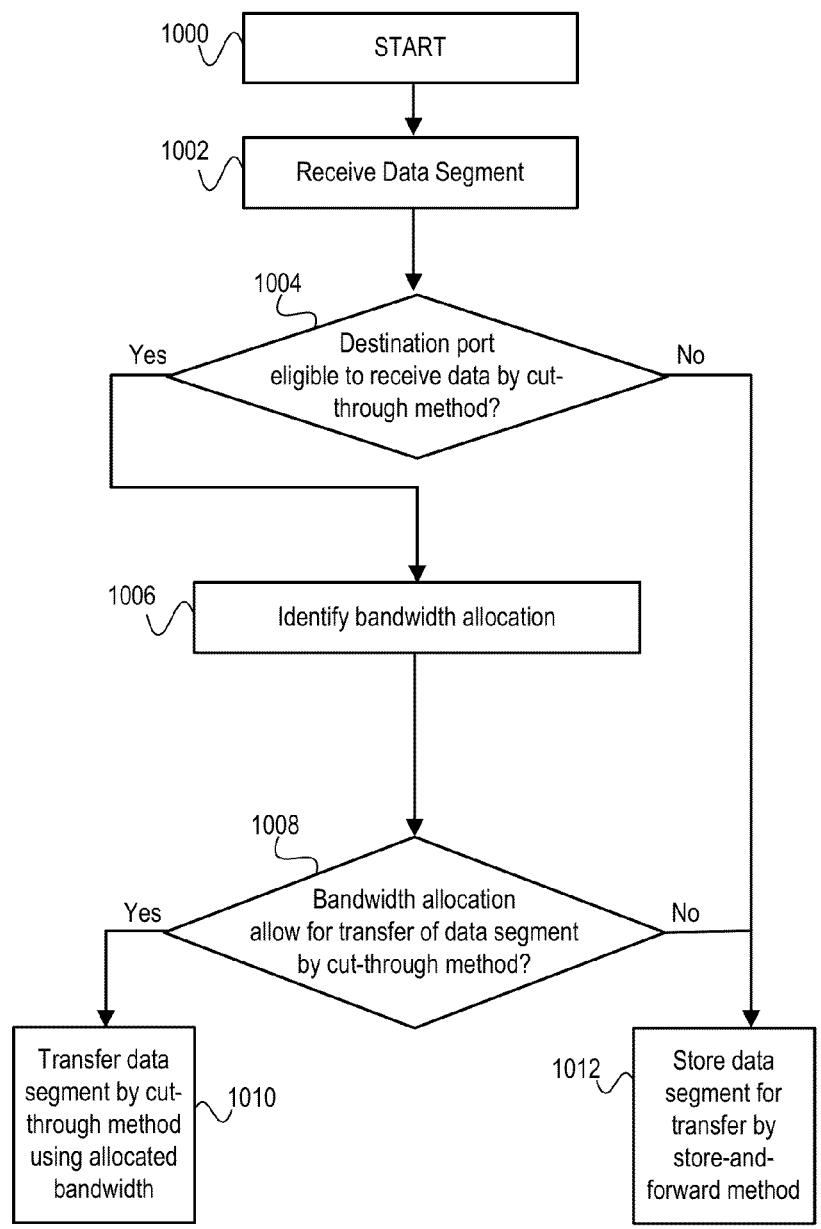
FIG. 10 is a flow diagram of an exemplary logic for transferring data.

FIG. 10 is a flow diagram of exemplary logic for transferring data. The logic may be carried out, for example, by the control module 520 of the ingress node 510. The logic may be used to determine when a bandwidth allocation of an ingress node 510 is sufficient to transmit a data segment to an egress node using a cut-through data transfer. The logic may begin at block 1000.

At block 1002, an ingress node, such as ingress node 510, may receive a data segment. The data segment may be the same as, similar to, or resemble the data 560. The data segment may be a portion or piece of data from a larger data packet. The data segment may be destined or intended to be sent to a destination egress port, such as an egress port of egress node B 535. The control module 520 or ingress node 510 may analyze the data segment. The control module 520 may determine the destination egress port for the received data segment and/or a bandwidth necessary to transmit or transfer the data segment to the destination egress port.

At block 1004, the ingress node 510, or a control module 520, may determine whether the destination egress port is eligible to receive the data segment according to a cut-through mode of data transfer. The control module 520 may determine whether the destination egress port is eligible to receive the data segment using a cut-through data transfer or mode of data transfer in various ways, such as by receiving an indication from a centralized controller of a system (such as system 505), or by receiving and analyzing information from the egress port and other ingress nodes. The cut-through data transfer or mode of data transfer may include transferring a data segment of a larger data packet to an egress port before the rest of the larger data packet has been received at the ingress port. The cut-through data transfer or mode may include transferring a data segment to an egress port without storing the data segment in an internal memory or buffer of the receiving ingress node.

At block 1006, the ingress node 510 or control module 520 may identify a bandwidth allocation (or an amount of the ingress node bandwidth for transferring cut-through data or store-and-forward data) for the ingress node 510. The ingress node 510 or control module 520 may perform one or more functions or run a portion or all of the logic of FIG. 9 to determine a bandwidth allocation for the ingress node 510. The bandwidth allocation may indicate or identify portions or amounts of the bandwidth used by ingress node that may be configured or operable to transmit or transfer data to an egress node using different modes or types of data transfer, such as cut-through or store-and-forward. The bandwidth allocation may indicate or identify an amount of bandwidth of the ingress node 510, or a number of ingress ports of the ingress node 510, that may be configured or operable to transmit data to an egress node or egress port, such as the destination egress port, using a cut-through data transfer.

At block 1008, the ingress node 510 or control module 520 may determine whether the bandwidth allocation identified in block 1006 may enable, allow, or be sufficient for the transfer of the received data segment using a cut-through data transfer. The ingress node 510 or the control module 520 may compare a bandwidth necessary to transmit the data segment to the egress port immediately (such as through a cut-through data transfer or mode of data transfer) with an available bandwidth allocated to or for immediate or cut-through data transfers. The bandwidth necessary to transmit the data segment to the egress port immediately may be or represent a threshold, upon which the available bandwidth may need to be greater than before allowing the data segment to be transferred to the egress port using a cut-through data transfer. The threshold may be about zero, such that any amount of bandwidth that is available for transferring cut-through data may be greater than the threshold level.

Where the allocated bandwidth enables, allows, or is sufficient for transferring the data segment to the egress node using a cut-through data transfer (such as where the allocated bandwidth is greater than a threshold value such as the amount of bandwidth necessary to transfer the data segment using a cut-through data transfer), the logic of block 1010 may be executed. The ingress node 510 or the control module 520 may transfer the data segment immediately, using a cut-through mode or type of data transfer, to the destination egress port using the allocated amount of the ingress node bandwidth.

If instead the allocated bandwidth does not enable, does not allow, or is not sufficient for transferring the data segment to the egress node using a cut-through data transfer (such as where no amount of the ingress node bandwidth may be used for performing a data transfer using a cut-through data transfer), the logic of block 1012 may be executed. The ingress node 510 or the control module 520 may store the data segment in a memory or buffer, such as buffer 515 or the ITM 415. The ingress node 510 and the control module 520 may store subsequent data segments for the same data packet in the buffer 515 or the ITM 415 until the entire data packet has been received and/or stored. Once the entire data packet has been received at the ingress node 510 and the ingress node 510 has bandwidth to transfer the data packet to the egress port using a store-and-forward mode of data transfer, the data may be transferred to the egress port using a store-and-forward data transfer.

In some variations, the logic of FIG. 10 may include fewer or more blocks or functions. In some variations, one or more blocks may perform different functions, or one or more blocks may be combined into fewer functions or determinations. In some variations, one or more blocks or functions may be performed in a different order or at the same time. For example, in a variation, blocks 1006 and 1008 may be executed or performed before block 1004. Various other examples and variations of logic are possible.

The logic of FIG. 10 may enable the control module 520 and ingress node 510 to determine when a data segment that is received may be transferred using either the cut-through data transfer or the store-and-forward data transfer. The logic of FIG. 10 may also or alternatively indicate or determine how much of an ingress node bandwidth may be used for transferring the data segment. The resource allocation may be provide a balance and trade-off between the immediacy of transferring cut-through data with the desire to avoid undue delays in transferring store-and-forward data. The logic of FIG. 10 may further allow the control module 520 and the ingress node 510 to quickly assess the state of the ingress node and bandwidth availability, and adjust and dynamically control data transfer from the ingress node.

A control module 520 may provide a mechanism for adaptively allocating bandwidth for high bandwidth cloud devices and architectures. The control module 520 may resolve fabric access contention between scheduled data transfers or traffic (such as store-and-forward data) and unscheduled data transfers or traffic (such as cut-through data). The control module 520 may apply a bandwidth allocation or bandwidth ratio based on a state of an ingress node 510 or other chip. The control module 520 may apply thresholds and algorithms that may shift bandwidth available to an ingress node 510 based on a range or value of a monitored ingress node parameter. The shifting of bandwidth available to the ingress node 510 by the control module 520 may enable a bandwidth ratio to be adaptively configured based on the state of the ingress node. The control module 520 may dynamically or adaptively change an order or priority of data transfer for data at an ingress node 510.

Resource allocations and/or cut-through decisions may be made every clock cycle, or more or less frequently. A bandwidth allocation may be made when a portion of data is received, when a node parameter changes, or at various other times. Ingress node may run one or more algorithms or functions to determine, based on the status and parameters of the operation of the ingress node, whether a data packet may be transmitted or delivered to an egress port using a cut-through data transfer. These algorithms or functions may be run in parallel on each ingress node at or near the same time. These methods and systems may significantly improve an efficiency of data transfer at each ingress node, may reduce computational time of a system, and may allow for data to be transferred through a system 105 more quickly and efficiently. These methods and systems may provide a useful distributed functionality for cloud processing, financial sectors, and social networking, where low latency and high bandwidth may be needed and useful to drive revenue.

The methods, devices, and logic described above, such as the ingress nodes or ports, egress nodes or ports, and/or controllers or control modules of ingress or egress nodes or ports, may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for transferring data, comprising:
   an ingress node and an egress node, the ingress node including a buffer and operated based on a monitored node parameter to transfer data at a determined bandwidth; and
   a controller in communication with the ingress node, the controller configured to allocate an amount of the determined bandwidth for directly transferring data from the ingress node to the egress node to bypass the buffer, the amount of bandwidth allocated being based on the monitored node parameter, where the monitored node parameter includes a length of time that the ingress node has directly transferred data bypassing the buffer, and the amount of the determined bandwidth allocated for directly transferring data varies inversely with the length of time that the ingress node has directly transferred data bypassing the buffer.

2. The system of claim 1, where the controller is configured to identify a change in the monitored node parameter.

3. The system of claim 2, where the controller is configured to adjust the allocated amount of the determined bandwidth for directly transferring data based on the identified change in the monitored node parameter.

4. The system of claim 1, where the monitored node parameter includes a fill level of the buffer of the ingress node.

5. The system of claim 4, where the allocated amount of the determined bandwidth for directly transferring data varies inversely with the fill level of the buffer of the ingress node.

6. The system of claim 1, where the ingress node includes a set of ingress ports; and
   where a ratio of the allocated amount of the determined bandwidth for directly transferring data corresponds to a ratio of: a number of ingress ports of the set of ingress ports allocated for directly transferring data from the ingress node to the egress node to bypass the buffer to a total number of ingress ports in the set of ingress ports.

7. A method for transferring data, comprising:
   monitoring a parameter of an ingress node;
   identifying a total bandwidth allocated to the ingress node;
   allocating, based on the parameter, a first amount of the total bandwidth to a cut-through mode of operation of the ingress node, the cut-through mode of operation comprises transferring a data segment of a first data packet to an egress node before a subsequent data segment of the first data packet is received at the ingress node, where the parameter includes a length of time the ingress node has transferred previous data packets using the cut-through mode and said first amount of the total bandwidth allocated to the cut-through mode varies inversely with said length of time;
   transferring, by the ingress node, the data segment using the cut-through mode using at least part of the first amount of the total bandwidth;
   allocating, based on the parameter, a second amount of the total bandwidth to a store-and-forward mode of operation of the ingress node, wherein the store-and-forward mode of operation comprises transferring a second data packet stored in a memory of the ingress node; and
   transferring, by the ingress node, the second data packet using the store-and-forward mode using at least part of the second amount of the total bandwidth.

8. The method of claim 7, where the first amount of the total bandwidth is allocated based on a comparison of the parameter with an entry in a look-up table.

9. The method of claim 7, where the first amount of the total bandwidth is allocated based on an allocation algorithm that receives the parameter as an input.

10. The method of claim 7, where the second amount of the total bandwidth comprises a difference between the total bandwidth and the first amount of the total bandwidth.

11. The method of claim 7, where the parameter includes a fill level of the memory, a store-and-forward credit, an enqueue rate, or a dequeue rate.

12. The method of claim 7, further comprising updating the allocated first amount of the total bandwidth and the allocated second amount of the total bandwidth in response to a change in the parameter.

13. An ingress node, comprising:
a data transfer component configured to transfer data using total bandwidth;
a buffer in communication with the data transfer component and configured to store data about data packets;
an interface in communication with the data transfer component and configured to receive a data segment of a data packet; and
a controller in communication with the data transfer component, the buffer, and the interface, wherein the controller is configured to:
allocate a first portion and a second portion of the total bandwidth to a first mode of operation and a second mode of operation respectively, wherein the first mode of operation comprises transfer of a data segment of a first data packet that is stored in the buffer, and the second mode of operation comprises transfer of a data segment of a second data packet without being buffered, where said second portion allocated is inversely related to a length of time the ingress node has operated in the second mode of operation.

14. The ingress node of claim 13, where the controller is configured to store the data packet in the buffer when the second portion of the total bandwidth is not sufficient to transfer the data segment of the second data packet to an egress node.

15. The ingress node of claim 14, where the data transfer component is configured to transfer the data segment from buffer with the first portion of the total bandwidth after a subsequent data segment of the data packet is received at the interface.

16. The ingress node of claim 14, where the data stored in the buffer is destined for another egress node, and where the data transfer component does not transfer the data stored in the buffer until a data transfer credit is received from the another egress node.

17. The ingress node of claim 13, where the data segment includes an identifier indicating an egress node that the data packet is to be transferred to, and where the controller determines whether the identified egress node is idle or available to receive the data segment before a subsequent data segment of the data packet is received at the interface.

18. The ingress node of claim 13, where the first portion is allocated to the first mode of operation based on a length of time the ingress node has operated in the first mode of operation.

19. The ingress node of claim 13, where said second portion allocated is further based on a fill level of the buffer.

* * * * *